Figure 3:
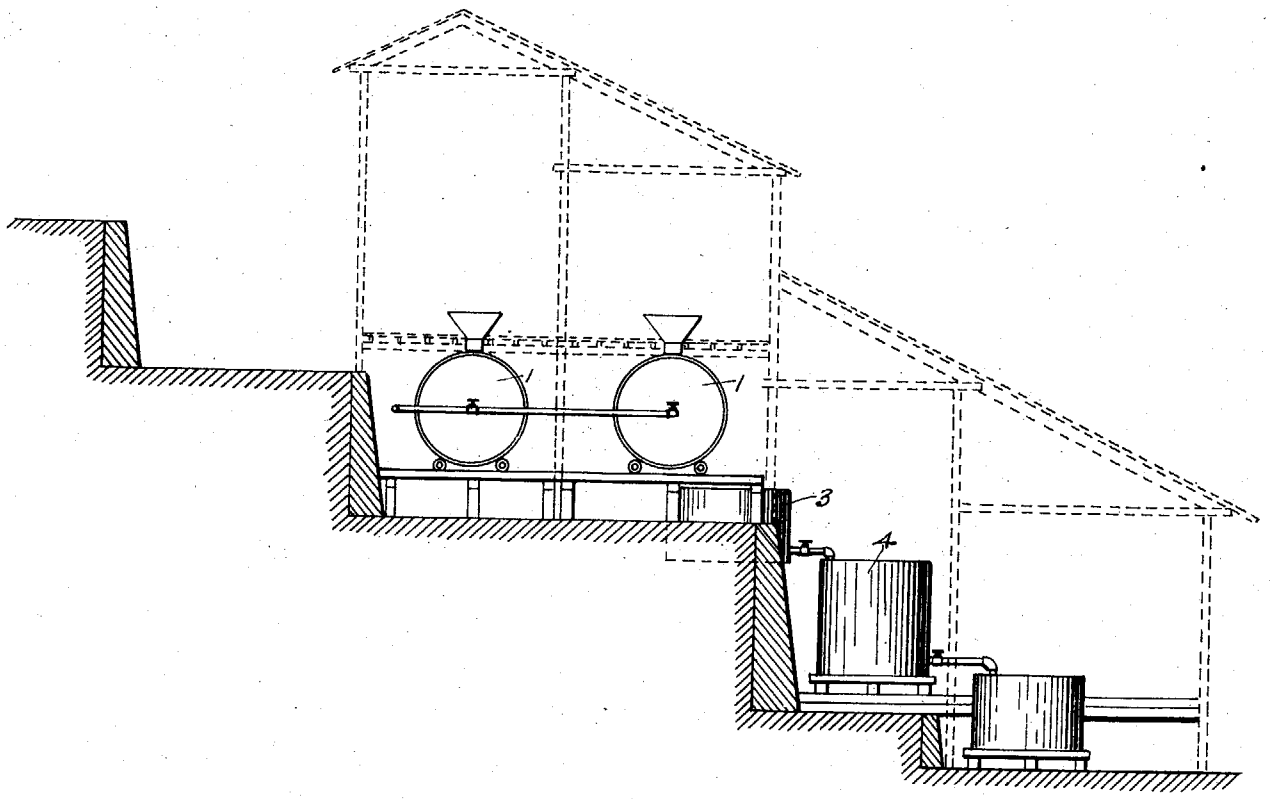

No. 12,815. REISSUED JUNE 16, 1908.
H. M. WILCOX.
METHOD OF RECOVERING COPPER FROM ITS ORES.
APPLICATION FILED DEC. 21, 1906.
2 SHEETS—SHEET 1.
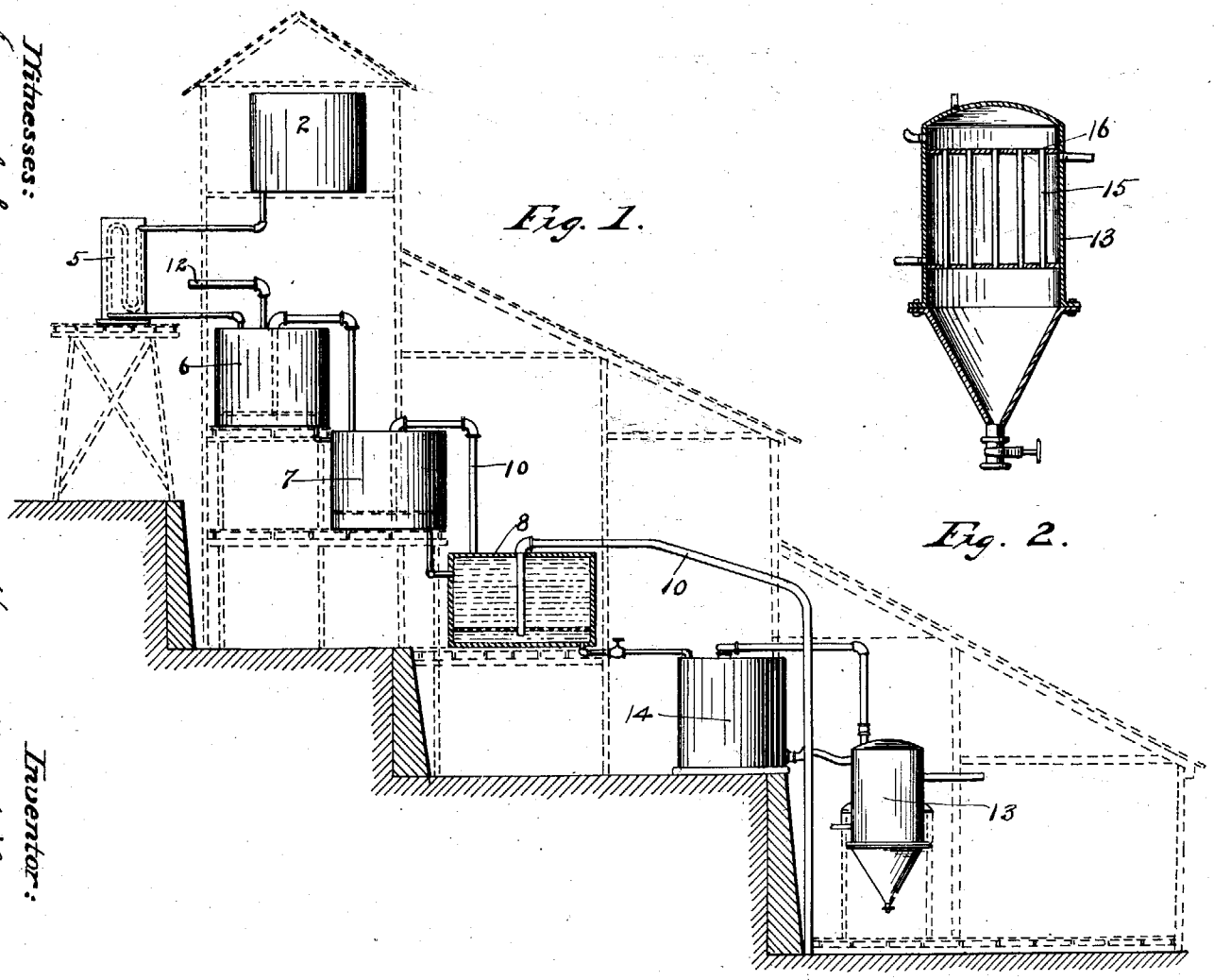
Witnesses:
Elliott R. Goldsmith
Chas. A. Becker
Inventor:
Henry M. Wilcox,
By Hugh W. Wagner,
His Attorney.

No. 12,815. REISSUED JUNE 16, 1908.

H. M. WILCOX.

METHOD OF RECOVERING COPPER FROM ITS ORES.

APPLICATION FILED DEC. 21, 1906.

2 SHEETS—SHEET 2.

Witnesses:
Elliott R. Goldsmith
Chas. A. Becker.

Inventor:
Henry M. Wilcox,
By Hugh K. Wagner,
His Attorney.

UNITED STATES PATENT OFFICE.

HENRY M. WILCOX, OF CHICAGO, ILLINOIS, ASSIGNOR TO ESMERALDA COPPER PRECIPITATING COMPANY, OF CHICAGO, ILLINOIS, A CORPORATION.

METHOD OF RECOVERING COPPER FROM ITS ORES.

No. 12,815. Specification of Reissued Letters Patent. Reissued June 16, 1908.

Original No. 790,238, dated May 16, 1905, Serial No. 248,488. Application for reissue filed December 21, 1906. Serial No. 348,988.

*To all whom it may concern:*

Be it known that I, HENRY M. WILCOX, a citizen of the United States, residing at Chicago, in the county of Cook, State of Illinois, have invented certain new and useful Improvements in Methods of Recovering Copper from its Ores, of which the following is hereby declared to be a full, clear, and exact description.

The invention aims to obtain copper from its low-grade ores in metallic state by use of sulfur dioxid acting as a precipitant to throw down the copper under requisite conditions from cupric-sulfate solution, ordinarily constituting the leach liquor, the charge being treated under proper heat and pressure in a close vessel left with certain extent of free space therein, and due attention being given to the amount of free acid allowed to remain, the process thereby causing the copper to separate out practically in pure state with scarcely a trace of its oxid or sulfite present to impair the product.

Heretofore the use of sulfur dioxid as a reagent for recovery of copper from cupric-sulfate solution has been proposed; but the conditions of treatment laid down for the prior practice fail to derive the copper practically pure, the result instead being merely to produce a large amount of copper oxid or sulfite with more or less of granular metal intermixed. The percentage of metal recovered is apt to vary widely for successive charges treated, although in no event is the yield of much moment on comparison with the intermingled oxid or sulfite which goes down at the same time.

Under the new treatment recovery of the copper is had in isolated state nearly if not wholly free from oxid or sulfite, thus for the first time rendering the use of sulfur dioxid an economic precipitant when metallic copper is the product to be obtained.

While the present invention does not depend for its success upon any special form of plant or of precipitating vessel, experience has shown that an apparatus such as illustrated by the drawings that accompany may be used to advantage in dealing with copper carbonate or oxid ores of low grade.

In the accompanying drawings, forming part of this specification, in which like numbers of reference denote like parts wherever they occur, Figure 1 is a diagrammatic view of the main parts of the apparatus, partly in elevation, and partly in section; Fig. 2 is a vertical sectional view of the precipitating tank used; and Fig. 3 is a view of the leaching barrels and adjacent vats, in elevation.

The selected ore having been crushed and ground, as usual, is digested in rotating barrel 1 (shown in a conventional manner) with dilute sulfuric acid of not more than ten per cent. strength until the reaction with the copper in the ore is complete and the solution becomes neutral—say at the end of several hours. Test shows the finished solution to be of about 1.17 specific gravity with some 6.00 per cent. of copper present therein. Any increase in the strength of the acid will correspondingly increase the content of copper; but the point of saturation for the cupric-sulfate solution is soon attained, when the metallic copper present ranges, say, at about seven per cent. (7%). Regard being had to the lower reach of temperature to ensue in course of treatment later on, it is obviously useless to saturate the cupric solution only to lose again the excess salts when the solution cools down or chills. Hence the maximum acid strength may for economy be fairly fixed at about ten per cent. (10%), as already stated. The specific gravity of the solution varies somewhat in keeping with the quantity of refuse salts, such as iron or the like. After leaching is over the resultant cupric-sulfate solution in hot state is drawn from barrel 1 into the elevated settling-tank 2, while the refuse ore removed from barrel 1 is washed in tank 3 to recover the remnant of sulfate solution. Having run the dilute wash liquor into neutralizing tank 4 for reuse, the refuse ore is taken out of tank 3 and cast away upon the dump. The hot solution of cupric sulfate present in settling-tank 2 may be treated there by airblast to throw down any excess of iron salts or other impurities if present in quantity—say five per cent. or over—sufficient to prove a nuisance later on. Should the iron or other impurities be present only in minor quantity, they can be ignored. After the precipitates settle away the clear solution of cupric sulfate is allowed to run from tank 2, through cooler 5, into the topmost absorption-vat 6.

Cooler 5 may be a simple pipe rebent in series form and submerged in the water vessel. Absorption-vat 6, like the others of the set—viz., 7 and 8—is closed at top, but near the base is furnished with a perforated false bottom to sustain a charge of crushed copper ore, ordinarily such as the solution itself comes from. At bottom the companion vats 6, 7, and 8 are united by suitable pipes, through which the solution of cupric sulfate is tapped off and descends from vat to vat at intervals, say, of about every two hours. The ore found in such vat acts to take up any free acid, so that the sulfate solution is kept neutral while absorption by it of the sulfur-dioxid gas proceeds. A sufficient supply of sulfur dioxid can be had by burning sulfur or sulfid ore in some suitable furnace, from which the evolved gases are drawn by aid of an exhaust-pump, with cooling-coil between to chill the gases before passing through the pump. After leaving the pump the gas is delivered by pipe 9 directly into the lower absorption-vat 8 at a point beneath the false bottom thereof. The dioxid gas bubbles up through the charge and passes on from vat to vat by pipes 10 and 11 until it is completely absorbed, the associated nitrogen finally emerging through exit 12 at vat 6 to the air.

The cupric-sulfate solution greedily dissolves the dioxid gas passing through it, so that the solution in lower vat 8 after an hour or so becomes completely charged. It needs no more and is at once drawn off into storage-tank 14 in readiness for precipitation treatment. The absorption of the dioxid gas is attended by a marked decline in temperature, which must result in turn in fouling the vats and connecting-pipes with a deposit of cupric sulfate passing out of solution if in excess at the low degree of heat.

The solution of cupric sulfate charged with sulfur dioxid stands at about 60° Fahrenheit and is found to contain: copper, 5.80 per cent.; combined sulfuric acid, 8.96 per cent.; and sulfur dioxid, 3.00 per cent., with a specific gravity 1.18 for the solution. The charge passes from storage-tank 14 into the precipitating vessel 13, which is made in any convenient form, here shown as a simple upright flue-boiler with the liquid circulating in its flues 15, while the steam for heating the charge surrounds the flues between the boiler-head plates 16.

According to practice distinctive of the invention, care must be taken not to overfill the boiler with the charge. Speaking roughly, a space representing about one-tenth of the total content of vessel 13 must be left vacant. When reaction occurs at high heat, the sulfur dioxid is energetically driven off in gaseous state. Space ample enough freely to receive the gas must be left within the vessel, so that, although still held within the vessel, the sulfur dioxid is no longer detained in the body of liquid to impair the success of the reaction.

Were the tank filled practically full, experience shows that it is impracticable to attain the requisite degrees of heat and pressure, and in such cases the copper goes down largely as an oxid or sulfite. It is best to provide ample space beforehand for free exit of the sulfur dioxid from the body of liquid at the critical reaction stage, lasting but a minute or so.

Having filled the boiler to the desired extent, the charge is simply heated in the closed vessel until it attains a proper temperature—*e. g.*, about 230° Fahrenheit and upward, although the best results are obtained at a temperature of 260° Fahrenheit—at which juncture it is under about one hundred and five pounds pressure. The reaction proceeds quickly with marked energy, the copper separating out and accumulating at the bottom, while any excess of sulfur dioxid passes off into the confined space at top.

Once the reaction is finished, a suitable cock is opened at top to release the excess of sulfur dioxid, which can be led away to some storage-receptacle for reuse. After the gas is vented it is simply requisite to draw off the spent liquor and thereafter remove and wash the copper precipitate preliminary to casting it into ingot form for the market.

In practice metallic copper representing one-third of the total copper present in solution has been obtained, showing 99.7 per cent. pure, while the spent liquor remains still rich in copper, analysis of the solution at specific gravity 1.175 disclosing copper, 3.87 per cent.; combined sulfuric acid, 6.00 per cent.; free sulfuric acid, 7.53 per cent.

Whenever the amount of free sulfuric acid in the spent solution is in excess of that required to dissolve as much copper from the ore as was precipitated, when the spent solution was produced, a suitable proportion of this spent solution may be treated separately with limestone or other suitable material in order to neutralize such excess of sulfuric acid, and the resulting neutralized spent solution may be evaporated to bring up the amount of cupric sulfate to the original strength, namely, six per cent. of copper. The main portion of the spent solution may be returned to the ore-tanks in order to neutralize its free sulfuric acid with unleached copper in the ore, after sufficient water has been added to bring the solution to its original volume, so that the percent. of contained copper when the solution is neutralized will not exceed the stated maximum of six per cent.

While the ordinary practice contemplates the use of dilute sulfuric acid for the leaching agent, it is entirely feasible to employ sulfur dioxid in its place, this being introduced into the revolving barrel 1 in liquid or gaseous form until the water present with the crushed ore is fully saturated.

The sulfur dioxid attacks the copper, iron, etc., present in the ore and may need to be replenished by further supply as the reaction proceeds. After leaving the barrel or even while there a minor percentage of sulfuric acid can be added to advantage sufficient to avert any premature deposit of copper oxid that might otherwise occur once the sulfur dioxid in solution should become deficient in quantity requisite to hold the copper in solution.

Owing to the heat of reaction the sulfite-sulfate solution of copper on withdrawal from barrel 1 should be chilled down, as before, by aid of cooler 5 after leaving the settling and purifying tank 2 in passage direct to storage-tank 14. Slight additions of sulfuric acid may occur at both tanks should the sulfur dioxid prove insufficient to stop premature deposit of the copper in oxid state. According to the modified practice the copper solution is not required to pass through absorption-vats 6, 7, and 8, since the sulfur dioxid has already been introduced at the outset as a dissolving agent.

By either procedure copper sulfate is found present in solution associated with practically a saturated solution of sulfur dioxid in readiness for treatment under heat and pressure at the precipitating vessel 13, having suitable space left therein for confined escape of the sulfur dioxid, while the copper separates in metallic form during the reaction. Either plan of leaching the ore falls equally within the scope of the claims presently set forth.

The proportions, degrees of heat, percentages, and the like heretofore stated are given for sake of illustration only in keeping with familiar practice and are not to be taken as exclusive. Variations therefrom may occur according to the knowledge of persons skilled in the art without essential departure from the scope of the invention.

Having thus described my invention, what I claim as new, and desire to secure by Letters-Patent, is:

1. The herein-described process of recovering metallic copper from its ores, which consists in leaching the ore with suitable reagent to form cupric sulfate solution, dosing the solution with sulfur dioxid, and, thereafter, while said solution is under a relatively high pressure, heating same to a temperature relatively high above the boiling point.

2. The herein-described process of recovering copper from its ores, which consists in leaching the copper from the ore with suitable reagent to form a neutral cupric sulfate solution, dosing the solution with sulfur dioxid, and, thereafter, heating said solution to a temperature relatively high above the boiling point under pressure suited for precipitation of the copper, in metallic form, and, subsequently, neutralizing the excess of sulfuric acid formed.

3. The herein-described process of recovering copper from its ores, which consists in leaching the copper from the ore with suitable reagent to form a neutral cupric sulfate solution, dosing the solution with sulfur dioxid, and, thereafter, heating said solution to a temperature relatively high above the boiling point and under pressure suited for precipitation of copper in metallic form, using a part of the resulting spent solution with its excess of free acid for dissolving copper from a new lot of ore until neutral for a new precipitation of copper in the metallic form under suitable heat and pressure after dosing with sulfur dioxid, and neutralizing the free sulfuric acid in the remainder of the spent solution with limestone or other suitable reagent, evaporating to original strength and precipitating metallic copper under suitable heat and pressure after dosing with sulfur dioxid.

4. The herein-described process of recovering metallic copper from its ores, which consists in leaching the ore with suitable reagent to form cupric sulfate solution, dosing the solution with sulfur dioxid, and, thereafter, heating said solution to a temperature relatively high above the boiling point and subjecting the same to pressure.

5. The herein-described process of recovering metallic copper from its ores, which consists in leaching the ore with suitable reagent to form cupric sulfate solution, dosing said solution with sulfur dioxid, and, thereafter, heating the solution to a temperature relatively high above the boiling point, subjecting same to pressure and neutralizing the excess of sulfuric acid formed.

6. The herein-described process of recovering metallic copper from its ores, which consists in leaching the ore with suitable reagent to form cupric sulfate solution, dosing said solution with sulfur dioxid, and thereafter heating the solution to such temperature as will drive off enough sulfur dioxid, and generate enough steam to subject the solution to a pressure of approximately 105 pounds per square inch.

7. The herein-described process of recovering copper in the metallic state from its ores, which consists in leaching the ore with suitable reagent to form cupric sulfate solution, removing the excess iron salts from said solution, dosing the solution with sulfur dioxid, and, thereafter, while said solution is under a relatively high pressure, heating same to a relatively high temperature above the boiling point.

8. The herein-described process of recovering copper in the metallic state from its ores, which consists in leaching the ore with suitable reagent to form cupric sulfate solution, blowing an air-blast through said solution, dosing said solution with sulfur dioxid, and, thereafter, while said solution is under a relatively high pressure, heating same to a relatively high temperature above the boiling point.

9. The herein-described process of recovering copper from its ores, which consists in leaching the ore with suitable reagent to form cupric sulfate solution, removing the excess of iron and other impurities therefrom, dosing said solution with sulfur dioxid, and, thereafter, obtaining a precipitate of metallic copper by heating said solution to a relatively high temperature above the boiling point while same is being subjected to a pressure in excess of 100 pounds per square inch.

10. The herein-described process of recovering copper from a solution of cupric sulfate containing not more than 5% of ferrous sulfate, which consists in dosing the solution with sulfur dioxid, and, thereafter, while said solution is under a relatively high pressure, heating same to a temperature which is relatively higher than the boiling point.

11. The herein-described process of recovering copper from a solution of cupric sulfate, which consists in dosing the solution with sulfur dioxid, and, thereafter, while said solution is retained in a closed receiver having proper vacant space therein, subjecting said solution to heat and pressure.

In testimony whereof, I have affixed my signature in the presence of two witnesses.

HENRY M. WILCOX.

Witnesses:
WILLIAM B. POTTER.
HUGH K. WAGNER.